UNITED STATES PATENT OFFICE.

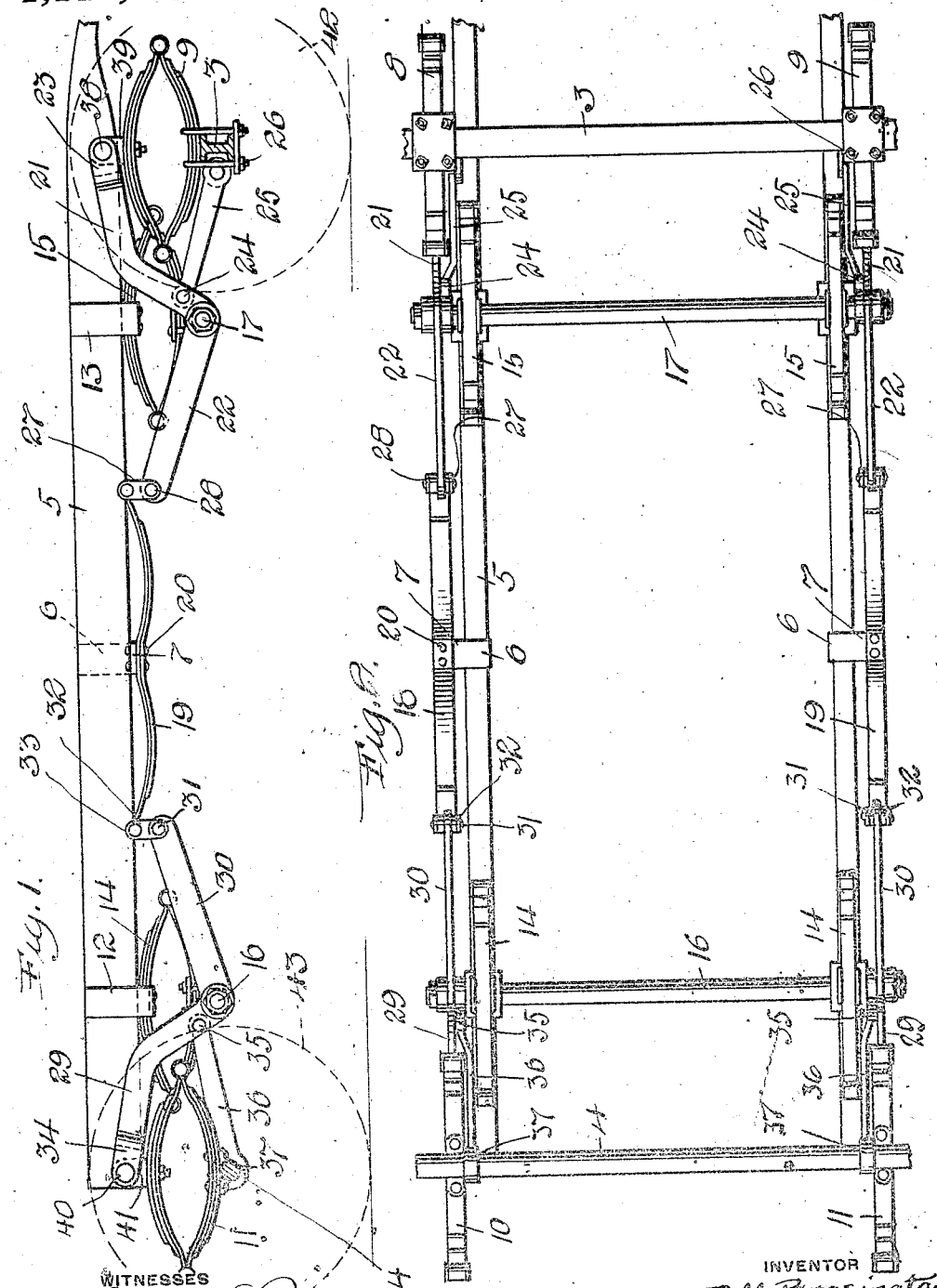

ROSS M. BRASINGTON, OF MARIETTA, OHIO.

SHOCK-ABSORBER FOR MOTOR-VEHICLES.

1,110,875.

Specification of Letters Patent. Patented Sept. 15, 1914.

Application filed March 28, 1914. Serial No. 827,838.

*To all whom it may concern:*

Be it known that I, ROSS M. BRASINGTON, a citizen of the United States of America, residing at Marietta, in the county of Washington and State of Ohio, have invented certain new and useful Improvements in Shock-Absorbers for Motor-Vehicles, of which the following is a specification, reference being had therein to the accompanying drawing.

This invention relates to shock absorbers for motor vehicles, and has for its object to provide means, in a manner as hereinafter set forth, connected with the axles and body of the vehicle for reducing shock to a minimum when the vehicle is traveling on uneven road bed or meets with an obstruction.

Further objects of the invention are to provide a shock absorber for the purpose set forth, which is simple in its construction and arrangement, strong, durable, efficient and convenient in its use, readily set up with respect to the vehicle body and axles, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings, wherein like reference characters denote corresponding parts throughout the several views:—Figure 1 is a side elevation of the chassis of a vehicle showing the adaptation therewith of a shock absorber in accordance with this invention, and Fig. 2 is an inverted plan view of the chassis, illustrating the shock absorber connected therewith.

Referring to the drawings in detail, 3 denotes the front axle of a vehicle and 4 the rear axle. The chassis of the vehicle is indicated at 5 and each side of the chassis 5 has secured to its inner face a vertically disposed angle-shaped bracket 6, having the horizontal arm 7 thereof projecting outwardly from that side to which the bracket is secured. Secured to the front axle 3 and mounted thereon are the front springs 8 and 9, and which are of the laminated type. Secured to and arranged upon the rear axle 4 are the rear springs 10 and 11 of the vehicle and which are of the laminated type.

Each side of the chassis 5 has secured thereto a vertically disposed pair of yokes 12 and 13, and the yokes 12 and 13 at each end of the chassis have secured thereto the springs 14 and 15 of the laminated type which are arranged in vertical alinement with respect to the sides of the chassis 5. The springs 14 and 15 at one side of the chassis 5 oppose the springs 14 and 15 at the other side of the chassis 5, and the spring 14 upon one side is connected to the spring 14 upon the other side by a transverse bar 16. The spring 15 upon one side of the chassis 5 is connected to the spring 15 upon the other side of said chassis by a transverse bar 17. The bars 16 and 17 project beyond the sides of the chassis 5.

Secured to the horizontal arm 7 of the bracket 6, are longitudinally extending laminated springs 18 and 19 and each of said springs is of double concave curvature. Each of the springs 18 and 19 is secured centrally to an arm 7 by the holdfast devices 20.

Pivoted upon each end of the rod 17 is a two armed lever one arm of which is indicated at 21 and the other at 22. The arm 21 is of greater length than the arm 22 and extends upwardly from the pivot of the lever and is curved. The forward end of the arm 21 is bifurcated as at 23. The arm 22 projects rearwardly and upwardly at an inclination from the pivot of the lever. Pivotally connected to the arms 21, as at 24, are links 25, and which are pivotally connected as at 26 with the front axle 3.

The forward ends of the springs 18 and 19 carry depending pivoted links 27 which have their lower ends pivotally connected as at 28 to the rear termini of the arms 22. Mounted upon the projecting ends of the rod 16 are two armed levers and one arm of each lever is indicated at 29 and the other arm at 30. The arm 30 is of less length than the arm 29 and projects forwardly and upwardly at an inclination from the pivot of the lever. The forward termini of the arms 30 are pivotally connected as at 31 to the lower ends of links 32, which are pivotally connected as at 33 to the rear ends of the springs 18 and 19. The arms 29 are of greater length than the arms 30 and each have their rear ends bifurcated as at 34. The arms 29 project rearwardly and upwardly from the pivot of the levers and are slightly curved. Pivotally connected to the arms 29 as at 35 are links 36, which are pivotally mounted as at 37 upon the rear axle 4.

The bifurcated ends of the arms 21 are pivotally connected as at 39 to the lugs 38 projecting upwardly from the springs 8 and 9, and the bifurcated ends of the arms 29 are pivotally connected, as at 40, to vertically extending lugs 41 projecting upwardly from the springs 10 and 11.

When the front and rear wheels 42 and 43 of the vehicle meet with an obstruction, the springs and their connections absorb the shock to such an extent that very little thereof is imparted to the chassis 5, and under such circumstances, an occupant of the vehicle does not find it annoying when the vehicle is traveling over an uneven road surface or when the wheels of the vehicle meet with an obstruction.

What I claim is:—

1. A shock absorber comprising front and rear springs connected with the axles of a vehicle, intermediate springs connected with the body of the vehicle, levers pivotally connected with said intermediate springs and with the front and rear springs and links connecting said levers to said axles, and longitudinally extending springs adapted to be carried by the body of the vehicle and pivotally connected to said levers.

2. A shock absorber comprising intermediate springs suspended from the body of a vehicle, a pair of pivoted levers adapted to be arranged at each side of the body of the vehicle and having their pivots supported from said springs, spring and link connections between the levers of each pair, front and rear springs adapted to be supported upon the front and rear axles of the vehicle, means for pivotally connecting said levers to said front and rear springs, and pivoted link connections between said levers and said axles.

3. A shock absorber comprising intermediate springs supported from each side of a vehicle body, a pair of pivoted two armed levers adapted to be arranged at each side of the vehicle body, means supported from said springs and constituting pivots for said levers, the levers of each pair being oppositely disposed, spring and link connections between the inner arms of the levers of each pair, link connections between the outer arms of said levers and the axles of the vehicles, front and rear vehicle springs adapted to be mounted upon the axle of the vehicle, and means for pivotally connecting the free ends of the outer arms of said levers to said front and rear springs.

In testimony whereof I affix my signature in the presence of two witnesses.

ROSS M. BRASINGTON.

Witnesses:
C. T. O'NEILL,
JESSIE ARNOLD.